Figure 14:
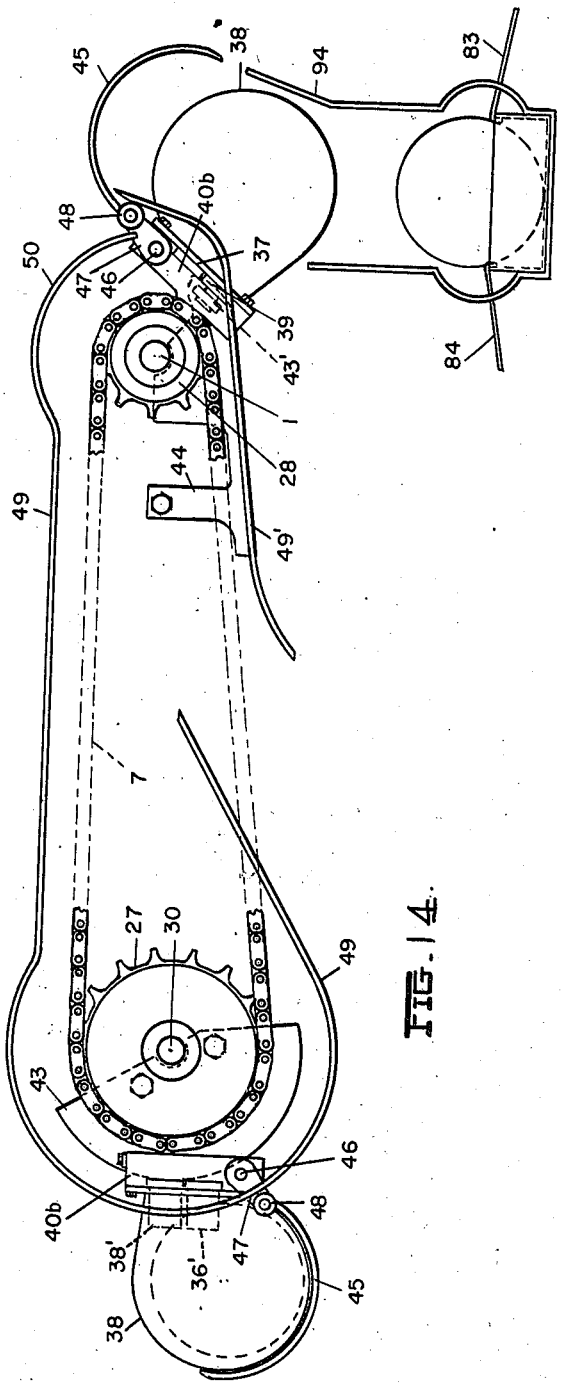

Jan. 5, 1943.  C. C. JOHNSEN  2,307,510
MACHINE FOR PACKING BUNS AND THE LIKE IN CARTONS
Filed Jan. 20, 1940  5 Sheets-Sheet 1
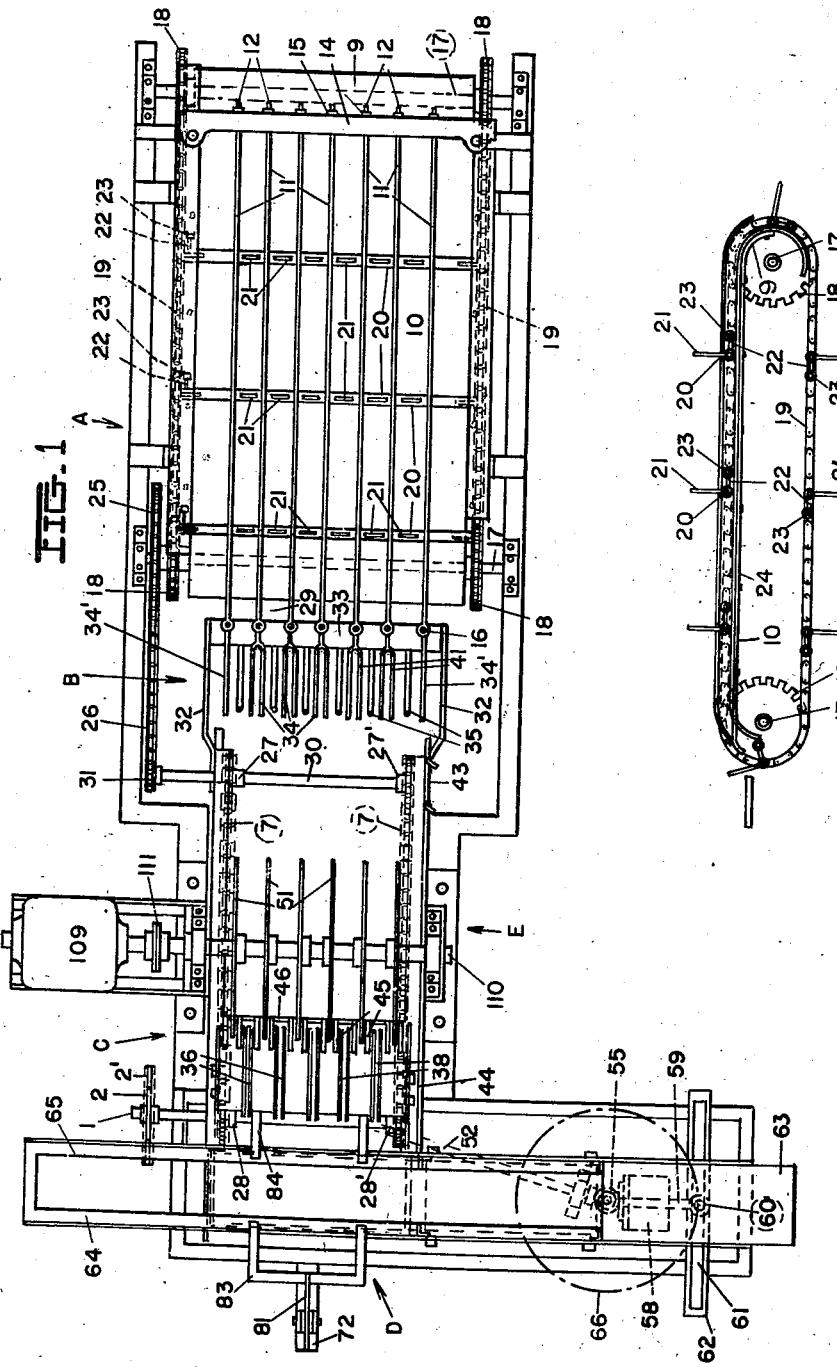
INVENTOR.
CLEMENT C. JOHNSEN
BY Oberlin, Limbach & Day
ATTORNEYS

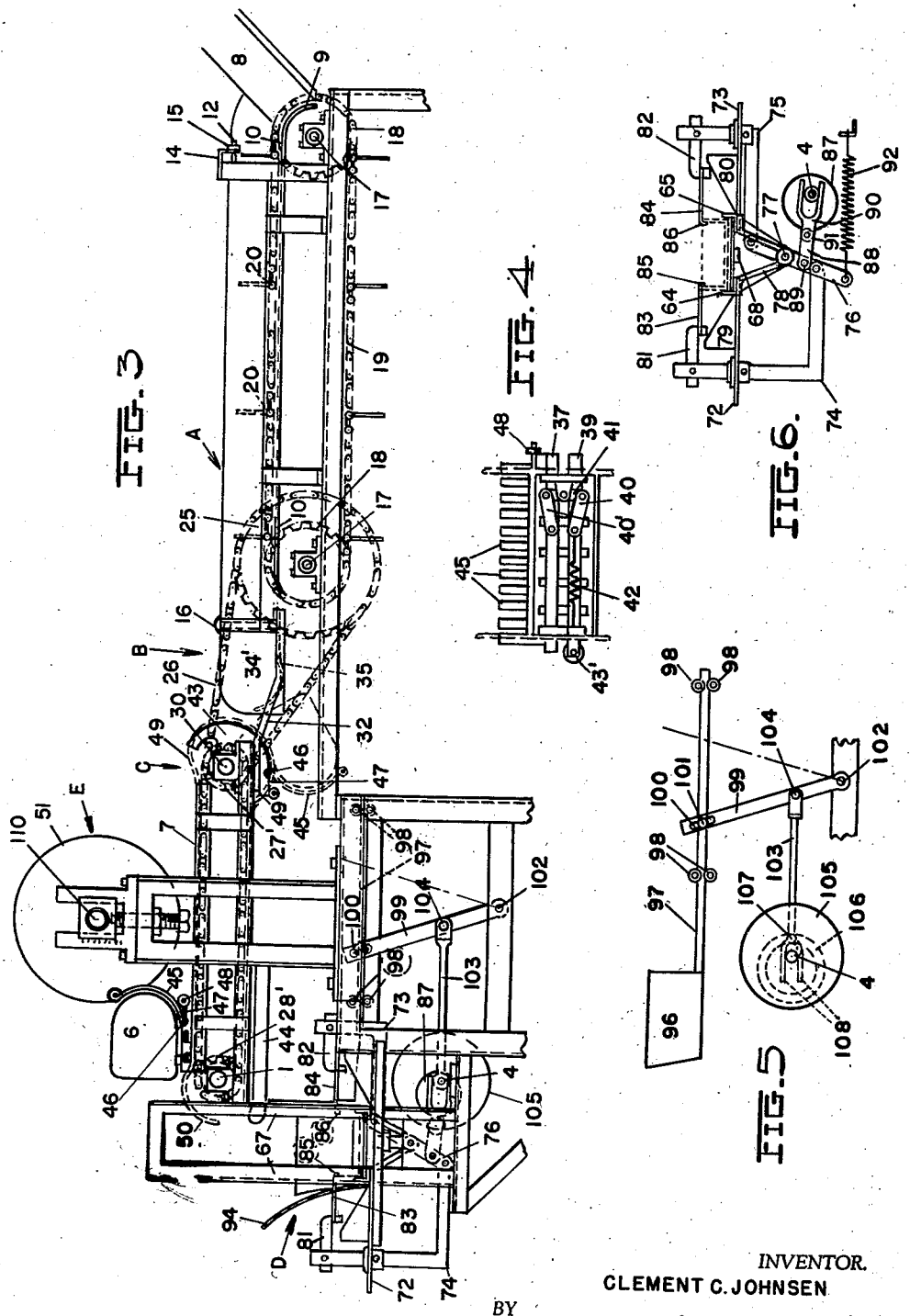

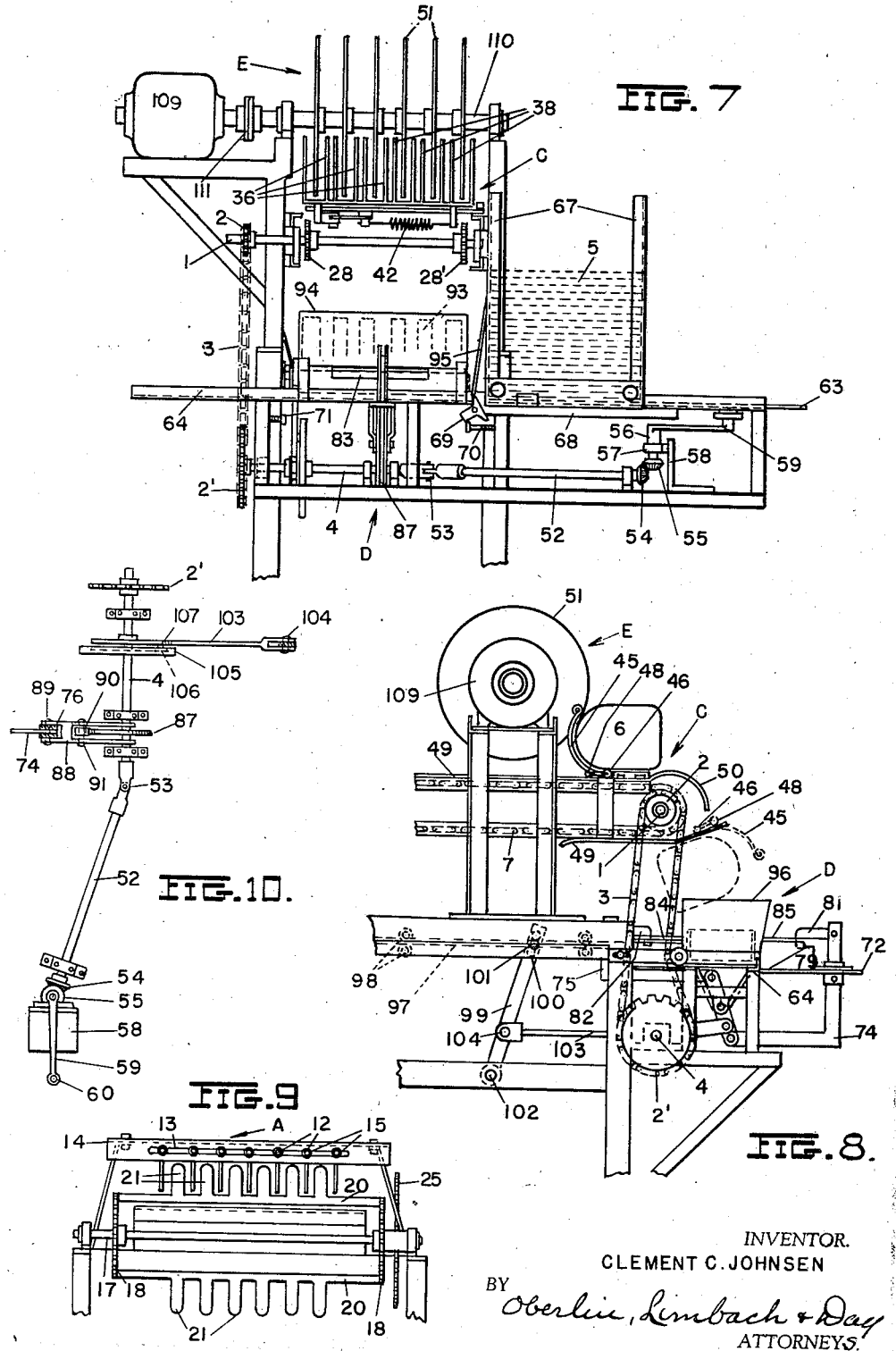

Jan. 5, 1943.  C. C. JOHNSEN  2,307,510
MACHINE FOR PACKING BUNS AND THE LIKE IN CARTONS
Filed Jan. 20, 1940  5 Sheets-Sheet 4
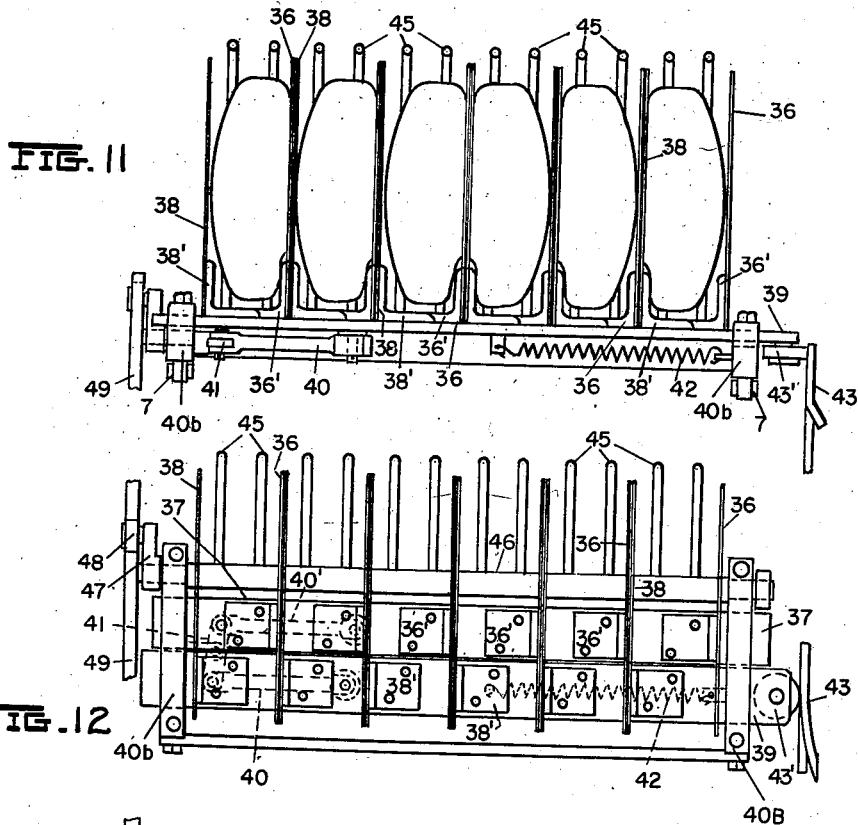
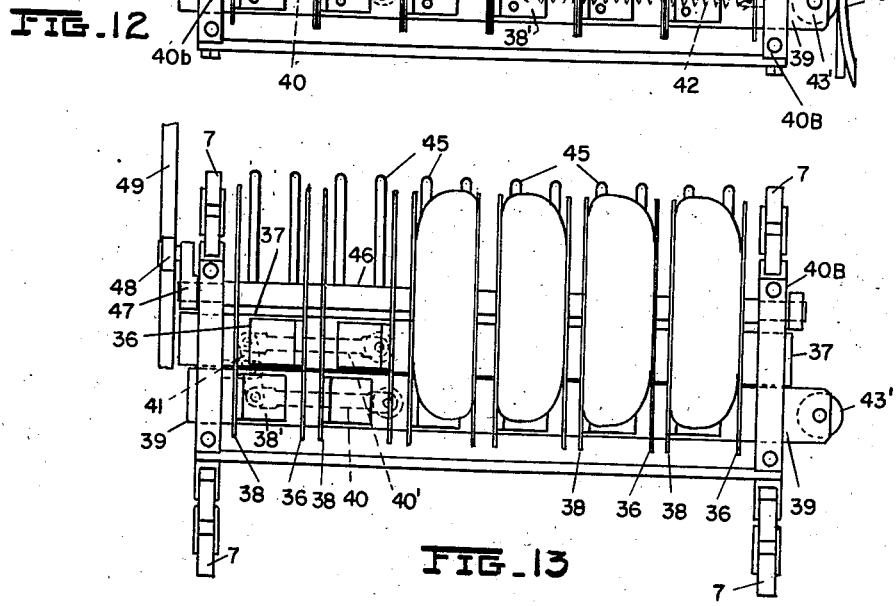
INVENTOR.
CLEMENT C. JOHNSEN
BY Oberlin, Limbach & Day.
ATTORNEYS Jan. 5, 1943.  C. C. JOHNSEN  2,307,510
MACHINE FOR PACKING BUNS AND THE LIKE IN CARTONS
Filed Jan. 20, 1940   5 Sheets-Sheet 5

INVENTOR.
CLEMENT C. JOHNSEN
BY Oberlin, Limbach & Day
ATTORNEYS

Patented Jan. 5, 1943

2,307,510

UNITED STATES PATENT OFFICE 2,307,510

MACHINE FOR PACKING BUNS AND THE LIKE IN CARTONS

Clement C. Johnsen, Phoenix, Ariz.

Application January 20, 1940, Serial No. 314,856

8 Claims. (Cl. 93—3)

My invention relates to machines for conveying buns and similar bakery goods from a source of supply and depositing same in packing cartons. In handling such products in a modern bakery it is desirable that mechanical means be provided capable of filling cartons, in continuous operation, with a desired number of buns so arranged as to fill the container. Also it may be desirable that the buns or similar product be split to a predetermined depth before placing in the cartons.

It is an object of my invention to provide in such a machine, devices which will advance buns and the like on edge in a plurality of rows to a plurality of stations from which they are picked up, conveyed to a packing station, and there deposited in a carton in a desired arrangement.

It is a further object of my invention, to provide in such a machine, devices which will supply folded cartons to such packing station and open same, said supply and opening being automatic and synchronized with movement of devices advancing such buns from station to station.

It is a further object of my invention to provide in such a machine, devices which will split the buns or similar bakery goods to a desired depth as they are advanced toward such packing station. To the accomplishment of the foregoing and related ends, said invention, then, consists of means as hereinafter fully described and particularly pointed out in the claims.

The annexed drawings and the following description set forth in detail certain mechanisms embodying the invention, such disclosed means constituting, however, but one of the various mechanical forms in which the principle of the invention may be used.

In said annexed drawings: Fig. 1 is a plan view of a particular embodiment. Fig. 2 is an elevational view of the guides controlling the feeder bars in the feeding table, Fig. 3 is a side elveational view of the machine of Fig. 1, Fig. 4 is a view showing the bottom arrangement of the carrier which operates across the transfer table, Fig. 5 is a side view of the mechanism operating the end guard of the carton-filling station, Fig. 6 is a side elevational view of the device for opening a folded carton when placed for filling, Fig. 7 is an elevational view of the front end of the machine, Fig. 8 is a side elevational view of the front end of the machine from the side opposite that shown in Fig. 3, Fig. 9 is a view of the rear end of the feeding table, and Fig. 10 is a plan view of the cross shaft which through cams operates the carton opener and shifts the end guard shown in Fig. 10, which plan view also shows the connecting shaft which drives the device for placing folded cartons in position for filling, Fig. 11 is a front elevational view of the carrier shown in Fig. 4, Fig. 12 is a top view of said carrier with plates in open position, Fig. 13 is a top view with plates in closed position for holding buns, and Fig. 14 is a view showing the cam tracks which operate the carrier.

Referring to the drawings, in which an embodiment of my invention is disclosed, a feeding device is shown indicated generally by "A", a collecting station is shown and indicated generally by "B", a transfer device with a carrier is shown and indicated by "C", and a packaging device is shown and indicated by "D". There is also shown and indicated generally by "E" a slitting device which optionally may be used. It will be understood that the power means for the transfer device and the packaging device are so connected and synchronized that after a carrier has delivered a deposit of buns in a carton, such carton will be removed and another folded carton will be placed in position and opened before a carrier is again in a position to deposit buns. To this end power for the machine is supplied through the shaft 1 which may be provided with an independent motor or may be synchronized through a drive sprocket which may be mounted on shaft 1, with a machine for wrapping the cartons after they are filled. The shaft 1 is part of, and drives, the transfer device C in which a bun carrier is advanced around a closed path by chain drives.

From sprocket 2 mounted on one end of shaft 1, a chain 3 drives the shaft 4 through sprocket 2' and provides the power which operates the device that transfers a folded carton from the pile 5 to a position for filling and then opens same. Also from a pair of sprockets 28 and 28' mounted on shaft 1, a pair of drive chains 7 connect with sprockets 27 and 27' on shaft 30 at the opposite end of the transfer device C. On chains 7 is mounted the carrier 6 which picks up buns at the collecting station B and transfers them to cartons at the packaging device D.

With one carrier 6 mounted on the carrier chains 7 in the transfer device indicated by C, the relation between sprockets 2 and 2' will be such that shaft 4 will revolve once for each round trip of the chains 7. When two carriers 6 are mounted on chains 7, the relation between the sprockets 2 and 2' will be such that shaft 4 will revolve twice for each round trip of the chains 7. Similarly the chains 7 may be lengthened and any number of carriers may be equally spaced thereon, making proper adjustment in the relation between the sprockets 2 and 2', to secure, during each complete trip of the chains 7, one complete revolution of the shaft 4 for each carrier mounted on the chains 7.

The preferred form of my invention as shown in the drawings will now be described, beginning at the rear end where the supplies of buns or similar bakery goods are delivered. Such supplies may be delivered by a loading chute 8 or by other desired means onto the apron 9 of a table top 10. Suspended lengthwise above said table top 10 at a slight distance therefrom and normal thereto are a plurality of metal sheets 11 forming passages through which the buns are to be advanced. These partition sheets 11 are supported at the feeding end of the table by threaded elements 12 affixed thereto and extended through a slot 13 in a cross-piece 14 mounted transversely above the table. Nuts 15 on said threaded elements permit fixed adjustment of the partitions and determine the width of the passages therebetween at the entering ends. The opposite end of said partitions 11 are supported by pivots 16 carried on the ends of the guide members 34 of the collecting station which will be described later.

Below each end of the table top 10, rotatably mounted transversely thereof are two shafts 17 each of which carries a pair of sprocket wheels 18. About these sprocket wheels 18 are mounted two chains 19, between which at spaced intervals are carried feeder bars 20, which are advanced from end to end of the table top 10, beneath the partition sheets 11. Each bar 20 carries a plurality of normal projections 21 which convey the buns through the passages formed by the sheets 11. These bars 20 are rotatably mounted in links of the chains 19 and each has a guide arm 22 mounted on one end which arm is fixedly mounted normal to the bar 20 and to the projections 21. Mounted in the free end of arms 22 are wheels 23 which follow guide track 24. This guide track 24 is curved to approximate the circumference of the sprocket wheel 18 at the feeding end of table top 10, but at the opposite end it curves more abruptly and well inside the sprocket wheel 18 as will be seen in Fig. 2. This permits the projections 21 on bars 20 to remain substantially upright as they move forward off the surface of table top 10 discharging across the gap 29 the buns they are carrying and delivering same onto the collecting station. A sprocket wheel 25 mounted on one end of one of the shafts 17 receives a drive chain 26 from a sprocket wheel 31 mounted on the end of shaft 30 in the transfer device C, and from this chain the feeding table is operated. The ratio between sprockets 25 and 31 is such that buns are supplied to the collecting station at the same rate as they are removed by the carrier.

Positioned in line with the feeding table and so spaced as to leave a narrow gap 29 between it and the discharge end of the feeding table is a collecting station indicated at B. This station is supported on arms 32 extended from the corners of the frame carrying the transfer device C, and comprises a flat member 33 joining the ends of arms 32, across which flat member 33 the buns are fed as the projections 21 of the feeder bars 20 shove them across the gap 29. On this flat member 33 and normal thereto are mounted a plurality of guide members 34 for guiding the plates of carrier 6. These guides 34 are fork-shaped with a width sufficient for two plates of the carrier to pass together between the prongs, except that the outside guides 34' consist each of a single plate. Extending from the flat member 33 between the guide members 34 and below same are wire supports 35, which are curved to receive and hold buns until they are picked up by the carrier.

The transfer device C comprises two parallel shafts 1 and 30. A pair of drive chains 7 operatively connect sprockets 27 and 27' on shaft 30 with sprockets 28 and 28' on shaft 1. One or more carriers are mounted on said chains 7. The carrier 6 in its movement about the closed path of the chains 7 picks up at the collecting station B a definite number of buns in a definite arrangement, carries them to the loading station D and deposits them in the same arrangement in a packing carton positioned to receive them. The carrier 6 is mounted between the chains 7 and comprises a plurality of plates 36 mounted in parallel relation on member 37 and a plurality of plates 38 mounted in parallel relation on member 39. Said plates may be so mounted by means of brackets as shown at 36' and 38'. Members 37 and 39 are slidably mounted in the base 40b of carrier 6 and are so connected by lever members 40, 41 and 40' that when one is shifted the other moves in the opposite direction. A spring 42 is operative to urge the plates 36 toward the plates 38. In the end of member 39 is mounted a roller 43' which engages the surfaces of a cam 43 as the carrier 6 approaches the bun collecting station B, and engages the surface of a cam 44 as the carrier 6 reaches a position to discharge a load of buns. The effect of these cam surfaces is to move the members 37 and 39 against the force of the spring 42, thereby urging plates 36 away from plates 38. The carrier 6 also comprises guards 45 which are arranged in pairs back of and between the pairs of plates 36 and 38. The guards 45 are fixedly mounted on member 46 which is rotatably mounted parallel to the members 37 and 39 in the carrier 6. A leg 47 carried by the member 46 at one end thereof and normal thereto, has a roller 48 mounted terminally. A track 49 engages said roller 48 as the carrier 6 approaches the collecting station and forces the guards 45 into position closing the spaces between the paired plates 36 and 38. When the carrier 6 reaches the discharge position at the packaging station D the track 49 is so curved as at 50 that the roller 48 and leg 47 lift the guards clear of the carrier and permit free discharge of the buns as the pairs of plates 36 and 38 are separated. By providing the guards 45 in pairs, instead of single guards, it is possible when desired to carry the buns past rotating knives 51 when it is desired to split the buns, as they are transferred from the collecting station B to the packaging station D.

The carrier 6, the bottom of which is shown in Fig. 4 and which is also shown in Figs. 1 and 7 in front view in position in the apparatus, is shown in detail in Figs. 11, 12 and 13. In Fig. 11 the plates 36 and plates 38 are in separated relation as when picking up buns from the collecting station B or when dropping buns at the loading station D. The plates are held in said relation by the cams 43 or 44 which engage the roller 43' as most clearly appears in Fig. 14. Roller 43' is mounted in the end of slidable member 39 upon which are mounted by welding or by brackets, as shown at 38', the plates 38. The plates 36 are similarly mounted on the slidable member 37. Levers 40, 41 and 40' so connect members 37 and 39, that movement of one will shift the other in the opposite direction. Both members 37 and 39 are slidably mounted through apertures in base members 40b, which are mounted upon the chains 7.

In Fig. 12 the carrier 6 is shown from above with the plates 36 and plates 38 separated by action of the cam 43 as shown in Fig. 11. In Fig. 13 is shown a top view of carrier 6 when roller 43' is free of the cams. It will be noted that under action of the spring 42 the plates 36 and 38 in each pair will move toward each other and firmly grasp the bun positioned therebetween.

In Fig. 14 is shown the relation of the carrier 6 with its rollers 43' and 48 and the cams 43 and 44 which engage the former and cam 49 which engages the latter as appears in Figs. 3 and 8. As the carrier 6 moves toward the loading station B, the roller 43' engages the cam 43 and plates 36 and 38 in each pair are urged apart. The roller 48 engages the cam track 49 and the guards 45 are urged to position barring at the rear the spaces between the pairs of plates 36 and 38. The buns are picked up and as the carrier 6 travels around the sprockets 27 and 27' mounted on shaft 30, the roller 43' passes off the cam 43 and plates 36 and 38 move together under the force of spring 42 holding the buns firmly. When carrier 6 approaches the loading station D and passes about the sprockets 28 and 28' on shaft 1, the roller 48 passes a curved portion 50 of cam track 49 and drops therefrom to cam track 49' which lifts the guards 45 away from the plates in carrier 6. Immediately thereafter roller 43' engages cam 44 and the plates 36 and 38 of each pair are urged apart and the buns drop to the carton which has been placed for their reception.

The device for placing and opening cartons for the reception of buns delivered by the carrier 6 will now be described. This device is driven by the shaft 4 and in Fig. 10 said shaft with its connections is shown. An extension shaft 52 is connected to shaft 4 through the universal coupling 53, and drives the carton-placing device through the mitre gears 54 and 55. A short vertical shaft 56 is mounted in a bearing 57 supported by the bracket 58 and carries on its lower end one of the mitre gears 55. On the free end of shaft 56 a bell crank lever 59 terminates in a roller 60 which engages a slot 61 in a guide piece 62 affixed cross-wise to the under side of pusher-plate 63.

Angle bars 64 and 65 mounted transversely of the transfer device C just in advance thereof form a path over which cartons are fed to and away from the machine. The pusher-plate 63 is fitted between said angle bars 64 and 65 at one end thereof. A revolution of the vertical shaft 56 causes the bell crank lever to move its terminal roller 60 in the circular path 66. The roller 60 being confined in slot 61 will cause the pusher-plate to oscillate.

A stack 5 of folded cartons is placed between the angle bars 64 and 65, between the main body of the machine and the pusher-plate 63 when it is in extreme position, as shown in Fig. 1. As pusher-plate 63 is oscillated from such position its advancing end will engage the lowermost carton and shove it into position to be opened for the reception of buns from the carrier 6. The pile of cartons will be held in position by upright angle bars 67 affixed to the bars 64 and 65. The movement of the pusher-plate 63 is so adjusted, by reason of the length of the bell crank lever 59, that it shoves a folded carton entirely free of the pile 5 and leaves a clear space between the advanced carton and said pile 5 as the pusher-plate 63 is returned to its extreme position for again engaging a folded carton and advancing it.

Attached to the pushing end of pusher-plate 63 is a bar 68 which passes under the pile 5 of folded cartons and has mounted on its free end a trigger 69 which is set by stop 70, as pusher-plate 63 reaches extreme position, and which engages the packed carton and shoves it from the machine as the pusher-plate 63 advances another folded carton into position to receive buns from the carrier 6. As the pusher-plate 63 so places a folded carton, the trigger 69 will engage the stop 71 and will be re-set in a position which will permit it to return under the folded carton which has been placed for filling.

After a folded carton has been placed in position to receive buns from the discharging carrier 6 it is opened, or unfolded, by a device shown in Fig. 6. Slotted bars 72 and 73 support slidably the vertical legs of right angle members 74 and 75. The horizontal legs of said angle members 74 and 75 are terminally and pivotally connected to lever 76 at opposed points at equal distances from the fulcrum pin 77, which is supported by a yoke 78 suspended from the angle bars 64 and 65 at a position midway of the packaging station D. The slotted bars 72 and 73 are likewise affixed to and supported respectively by angle bars 64 and 65, being normal thereto in the plane defined thereby. Mounted on the slotted bars 72 and 73 and parallel to the slots are wedge shaped guides 79 and 80. Pivotally mounted in the upright legs of angle members 74 and 75, and extended toward each other normal to said upright legs, are L shaped arms 81 and 82. The short elements of these arms 81 and 82 bend down-ward and rest upon the inclined faces respectively of wedged shaped guides 79 and 80. Loosely the short elements of the arms 81 and 82 engage holes in the midpoints respectively of transverse members 83 and 84, each of which has its ends bent toward the other, forming long fingers which terminate in downwardly turned hooks 85 and 86.

The said device for opening folded cartons is operated by a cam wheel 87 eccentrically mounted on shaft 4. A forked connector 88 is pivoted to the lever 76 at pin 89 and is mounted with a prong on either side of the cam wheel 87. A wheel 90 mounted on a pin 91 connecting the prongs of forked member 88 is held firmly against the circumference of the cam wheel 87 by the spring 92 connected with the end of lever 76. Each prong of the forged member 88 is slit to fit over the shaft 4 and restrain movement of connector 88 to a reciprocation.

Guard plates, about the opened carton, guide the buns as they are dropped by the carrier 6 and prevent any from falling outside the carton set to receive them. The plate 93 at the rear of the carton is in fixed position and is slotted to permit the elements of the carrier 6 to pass therethrough, after it has deposited a load of buns, and begins the return trip to the collecting station B. The plate 94 in front of the carton is fixed in slightly elevated position to permit the forwardly extended fingers of member 83 to reach the folded carton and open same. The plate 95 next the pile of folded cartons is fixed, but sufficiently elevated to permit the passage of a folded carton thereunder. The plate 96 closing the side toward which the cartons are moved after filling, is made movable, that it may be withdrawn to permit passage of a filled carton.

Withdrawal of plate 96 is effected, in synchronism with the movement of the folded box to the loading position and its further advance therefrom after opening and filling, by reciprocation of the bar 97 to the forward end of which the plate 96 is attached. The bar 97 is mounted between pairs of rollers 98 and carries a pin 101 fitted in the slot 100 in the free end of lever 99 which is pivotally mounted on the pin 102 in the supporting frame of the machine. Midway of the lever 99 a pin 104 is the pivot in the end of the driving connector 103. The free end of the connector 103 is forked with the prongs 108 of the fork embracing the shaft 4. A flat disk 105 is mounted on the shaft 4 adjacent the prongs 108, which disk 105 has a circular cam groove 106 cut in one face thereof in eccentric relation to the shaft 4. A roller 107 mounted on the side of connector 103 near the terminal fork fits within said circular cam groove 106.

When it is desired to slit the buns before packing, a gang of rotary knives 51 mounted on a shaft 110 is mounted above the transfer device C in such position that the knives will each slit a bun passing thereunder to the desired depth. The shaft 110 and knives 51 mounted thereon are driven by the motor 109 through a coupling 111.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. A machine for packaging buns and similar bakery goods, comprising in combination, means operative to advance buns successively in rows to a plurality of loading stations; a plurality of loading stations adjacent each other in a row, which stations are operative to receive buns and separately support them on edge in parallel relation; a traveling carrier, operative to grasp and separately hold a plurality of buns so positioned at said stations, to convey same to a packaging station, and to deposit same in a packing carton at such packaging station; a continuous chain operative to convey said carrier around a closed path between loading stations and packaging station; means operative, during the return of said carrier to said loading stations, to place a folded carton at such packaging station and to advance therefrom a carton which has been filled; means operative to open such folded carton before return of said carrier from said loading stations; and power means driving in synchronized relation said continuous chain, said carton placing means and said carton opening means.

2. A machine for packing buns and similar bakery goods, comprising in combination, means operative to advance buns successively in rows to a plurality of loading stations; a plurality of loading stations adjacent each other in a row, which stations are operative to receive buns and separately support them on edge in parallel relation; a traveling carrier, operative to grasp and separately hold a plurality of buns so positioned at said stations, to convey same to a packaging station, and to deposit same in a packing carton at such packaging station; guards associated with said carrier, operative to engage the rear edges of buns conveyed thereby and to urge such buns forward, that they may be split by circular revolved knives when so positioned that said carrier is conveyed thereunder; a continuous chain operative to convey said carrier around a closed path between loading stations and packaging station; means operative, during the return of said carrier to said loading stations, to place a folded carton at such packaging station and to advance therefrom a carton which has been filled; means operative to open such folded carton before return of said carrier from said loading stations; and power means driving in synchronized relation said continuous chain, said carton placing means and said carton opening means.

3. In a machine for packaging buns and similar bakery goods, the improved device for feeding folded cartons to such machine and opening same, said feeding and opening being synchronized with the delivery of batches of buns by said machine, which said device comprises a shaft driven in desired synchronism with a bun carrier in said machine; a lever centrally pivoted; means operative to reciprocate said lever, which means include a cam mounted on said shaft; angled members having horizontal legs respectively connected to opposite ends of said lever and having vertical legs extending upwardly, said members being so mounted that movement of said lever reciprocates the horizontal legs and shifts the vertical legs of said members in opposite direction; wedge shape guides mounted between the vertical legs of said members, one being adjacent each leg; elements pivotally mounted in the end of each vertical leg of said members, said elements extending toward each other and each having its free end in sliding engagement with the wedge surface of the adjacent said guide; arm members loosely connected to the free end of each of said elements and in extension thereof, which arm members terminate at their free ends in downwardly turned fingers operative to engage an edge of a folded side of a carton placed there-between for filling; a pair of parallel guides, mounted transversely of the packaging machine, adapted to receive a folded carton, guide same to filling position and guide same away therefrom when filled; a feed plate slidably mounted between said guides; a slotted bar mounted on the underside of said feed plate and beneath said guides in transverse relation; a bell crank lever mounted on a vertical shaft with its free end engaging the slot in said bar; means operative to rotate said vertical shaft in unison with rotation of said first-named shaft, said bell crank lever being so positioned that said feed plate will be reciprocated thereby from an extreme position which permits placing a folded carton between said plate and the main body of the machine to a position where it will receive the buns conveyed by the machine and discharged; an ejection bar mounted by one end on the under side of said plate from which it extends toward said machine between said guides; a trigger on the free end of said ejecter bar operative to engage a filled carton and eject same along said guides as said pusher plate places another carton for filling; a stop operative to set said trigger that it may engage a carton; and a stop operative to unseat said trigger that it may be drawn back beneath the carton placed for filling.

4. A machine for packaging buns and similar bakery goods, comprising in combination, means operative to advance buns to a plurality of loading stations; a plurality of loading stations adjacent each other in a row, comprising finger like elements, each operative to support a bun edgewise, and paired means associated with each element operative to hold buns in such position and in parallel relation; a continuous chain operative to travel in a closed path from said loading station to a packaging station and return; a carrier mounted on said chain and comprising a plurality of pairs of elements operative to resiliently grasp a bun therebetween, and associated with the elements of each pair a finger operative to lift a bun from said loading station; means operative to release buns from said carrier and deposit them at a packaging station; a packaging station below the discharge end of the closed path followed by said chain, and comprising means operative to discharge a carton after said carrier has deposited buns therein, and means operative to place a folded carton below said discharge end and open same while said carrier travels to said loading station and back; and power means operative to drive in synchronized relation, said continuous chain, said carton removal means, said carton placing means and said carton opening means.

5. A machine for packaging buns and similar bakery goods, comprising in combination, means operative to advance buns successively in rows to a plurality of loading stations; a plurality of loading stations adjacent each other in a row, which stations are operative to receive buns and separately support them on edge in parallel relation; a packaging station, including means operative to place cartons in position to be filled and to remove cartons which have been filled; a continuous chain operative to advance in a closed path between said loading station and said packaging station; a carrier mounted on said chain and operative to lift buns from said loading station and to deposit them at said packaging station, said carrier including two bars slidably mounted normal to said chain, a plurality of plates mounted normally on said bars in successive pairs with alternate plates attached to alternate bars, means urging the plates of said pairs toward each other, means operative to urge the plates of said pairs away from each other when said carrier passes said loading station and when said carrier passes said packaging station; and power means driving in synchronized relation said continuous chain and said means operative to place and remove cartons.

6. A machine for packaging buns and similar bakery goods, comprising in combination, means operative to advance buns successively in rows to a plurality of loading stations; a plurality of loading stations adjacent each other in a row, which stations are operative to receive buns and separately support them on edge in parallel relation; a packaging station operative to receive batches of buns into cartons; a continuous chain operative to follow a closed path between loading stations and packaging station; a traveling carrier mounted on said chain and operative to grasp and separately hold a plurality of buns positioned at said loading stations, convey same and deliver same as a batch at said packaging station, said carrier including two bars slidably mounted normal to said chain, levers connecting said bars and operative to shift said bars in opposite directions responsive to pressure exerted on the end of one of said bars, a plurality of plates mounted normal to said bars in pairs with alternate plates attached to alternate bars and means urging the plates of each pair toward each other; cams adjacent the said loading stations and adjacent said packaging station having faces operative to engage and shift one of said bars, whereby the paired plates mounted on said bars are shifted away from each other; means operative to successively place folded cartons at said packaging stations and advance therefrom cartons which have been filled; means operative to open a folded carton when placed at said packaging station; and power means driving in synchronized relation said continuous chain, said carton placing means and said carton opening means.

7. In a machine for packaging buns and similar bakery goods, wherein the delivery of batches of buns is synchronized with the placing of folded cartons to receive such batches, the improved device for placing cartons comprising a pair of elongated guides positioned transversely of such machine at the delivery end thereof; means operative to maintain a supply of folded cartons horizontally in a vertical pile on said guides adjacent one side of such machine; a feed plate slidably mounted between said guides and operative to engage the bottom carton of such vertical pile and shove same into position to receive buns delivered by such machine; and means operative to reciprocate said plate in synchronism with movement of a bun carrier in such machine.

8. In a machine for packaging buns and similar bakery goods, operative to deliver batches of buns in synchronized relation with the placing of cartons to receive such batches, the improved device for placing and opening folded cartons comprising a pair of elongated parallel guiding members operative to support a supply of folded cartons horizontally in a vertical pile adjacent such machine; a plate slidably mounted between said guiding members, said plate being operative to engage a single folded carton at the bottom of such vertical pile and advance same into position to receive a batch of buns; means operative to reciprocate said plate in synchronism with movement of a bun carrier in such machine; and means operative to engage the edges of folded sides of a carton when advanced into position to receive buns and operative to open said carton, said last named means including an element reciprocably mounted normal to said guiding members and at one side thereof, a second similar element similarly mounted on the opposite side of said guiding members, means operative to shift said elements toward and away from each other in synchronism with movement of said plate, hooked fingers, one mounted on each of said elements and operative to engage an edge of a folded side of a carton placed in position to receive buns as said elements begin movement away from each other, and means operative to lift said hooked fingers out of engagement with such edges as said elements approach extreme position of their movement away from each other.

CLEMENT C. JOHNSEN.